Figure 1:
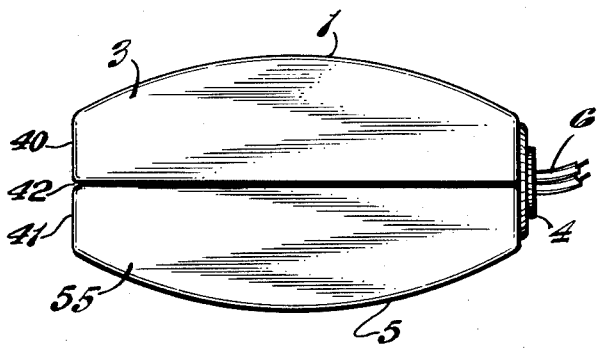

Oct. 21, 1952 — M. E. MACKSOUD — 2,615,120
POCKET SUN HEALTH LAMP
Filed Dec. 23, 1949 — 4 Sheets-Sheet 1

INVENTOR.
Michel E. Macksoud
BY Peter J. Gaylor
ATTORNEY

Oct. 21, 1952 — M. E. MACKSOUD — 2,615,120
POCKET SUN HEALTH LAMP
Filed Dec. 23, 1949 — 4 Sheets-Sheet 2

Inventor,
Michel E. Macksoud

Oct. 21, 1952  M. E. MACKSOUD  2,615,120
POCKET SUN HEALTH LAMP
Filed Dec. 23, 1949  4 Sheets-Sheet 3

Inventor.
Michel E. Macksoud
by Peter J. Taylor
Attorney

Oct. 21, 1952     M. E. MACKSOUD     2,615,120
POCKET SUN HEALTH LAMP

Filed Dec. 23, 1949     4 Sheets-Sheet 4

Inventor.
Michel E. Macksoud
by Peter J. Gaylor
Attorney

Patented Oct. 21, 1952

2,615,120

UNITED STATES PATENT OFFICE 2,615,120

POCKET SUN HEALTH LAMP

Michel E. Macksoud, Flushing, N. Y.

Application December 23, 1949, Serial No. 134,799

5 Claims. (Cl. 240—1)

This invention relates to a sun health lamp used for irradiation of the skin, or for other purposes, of compact and small design, suitable for carrying in a pocket without need of any auxiliary equipment, and embodying novel features heretofore unknown in the art.

Among the novel features of the sun lamp of the present invention are the unitary, compact structure, means for generating a powerful source of selective ultra violet radiation, highly effective means for focusing said radiations in a specific pattern of maximum efficacy, insulating means for preventing dangerous overheating of the case, a novel mercury arc radiation unit of plug-in design, use of resistance ballast heat to increase the efficiency of the mercury arc, and other features which will be hereinafter set forth.

Numerous sun lamps are now available on the market. Most of them are of the first type comprising floor models wherein the heavy transformer and other auxiliary equipment are contained in a housing on the floor, while the lamp projects above on the end of a stand. Besides generating beneficial erythemal ultra violet rays of therapeutic value, such conventional lamps also radiate a high percentage of harmful radiation composing the portion of the mercury spectrum below 2800 Å. wave length, thus necessitating the use of special glasses to prevent permanent injury to the eyes, and care in the administration of the radiation to avoid dangerous overexposure to the harmful rays. Besides being clumsy and harmful, such conventional lamps are expensive and form an unsightly addition to a room. Also, due to their bulk and weight, there is little tendency on the part of the owner to carry the lamp with him on trips and visits.

The second type, which was introduced later, is of the screw-in bulb design, in which the mercury arc is enclosed in a glass envelope, together with the incandescent ballast, the whole unit being adapted for screwing into an ordinary lamp socket. Among the disadvantages of this type are the lack of portability, bulkiness and fragility in transporting, lack of insulated areas, etc. A third type involves the large folding type lamp which is bulky, has uninsulated covers, generates considerable harmful radiation and operates at excessive wattage. There is still another type employing the carbon arc in which the carbon must be adjusted intermittently, but this type is becoming obsolete due to its inefficiency, dangerous radiation, poor control and requirement of constant adjustment.

In contrast thereto, the lamp of the present invention is of light weight, has an attractive pocket-book or compact appearance, and is easily carried around in the pocket without inconvenience. It may be operated immediately by standing it on edge, opening it like a book, and plugging it into a nearby 110 v. 60 cycle circuit, or other special circuit for which it may be designed. The rays emitted by the lamp of the present invention fall only in the erythemal range and hence it is unnecessary to wear special glasses, since one may close one's eyes when facing it, as would be done outdoors when facing the sun.

Figure 2:
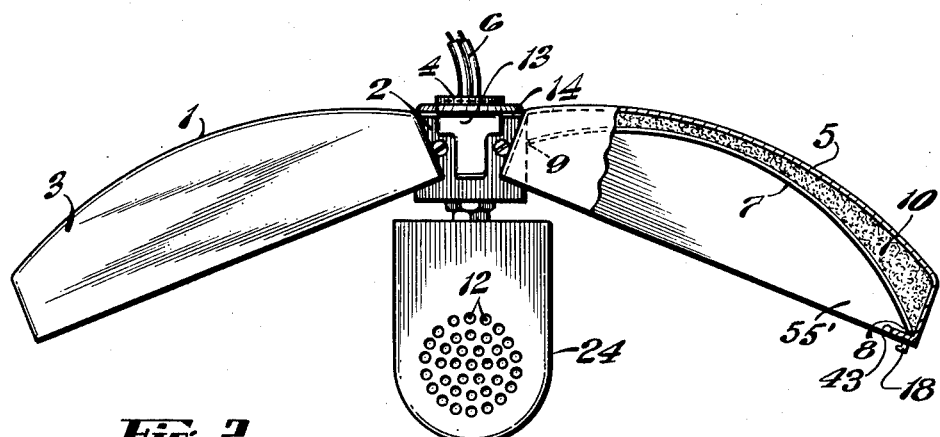
Figure 3:
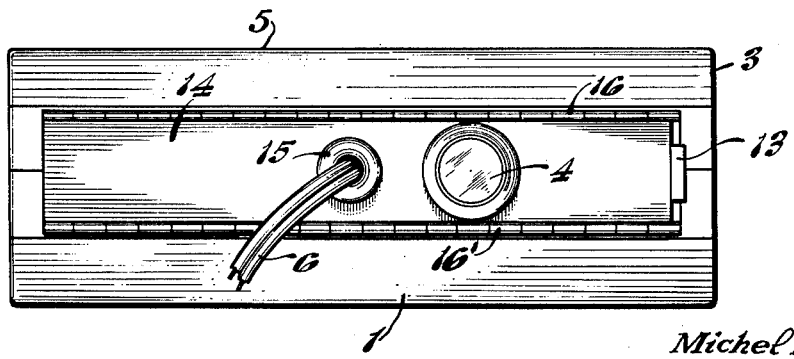
Figure 4:
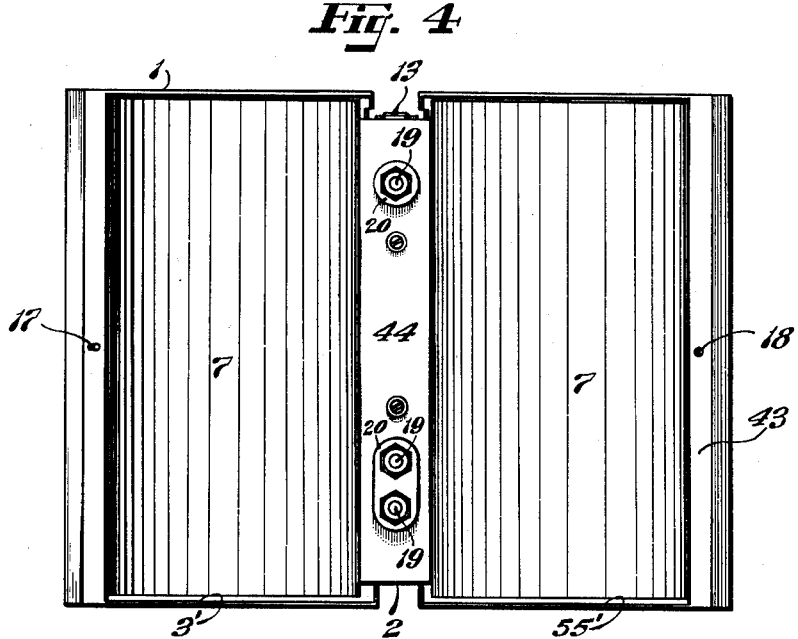
Figure 5:
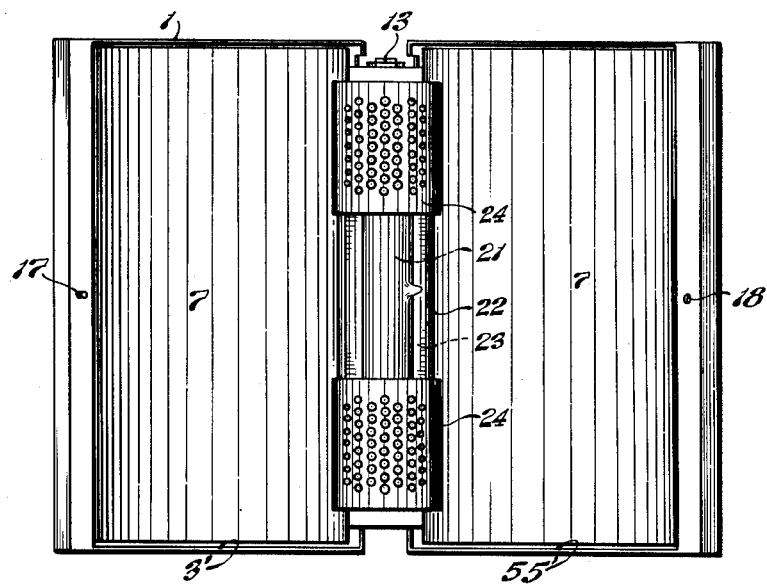
Figure 6:
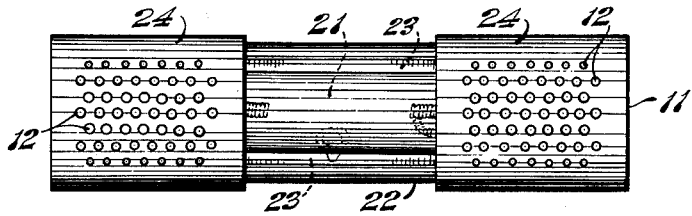
Figure 7:
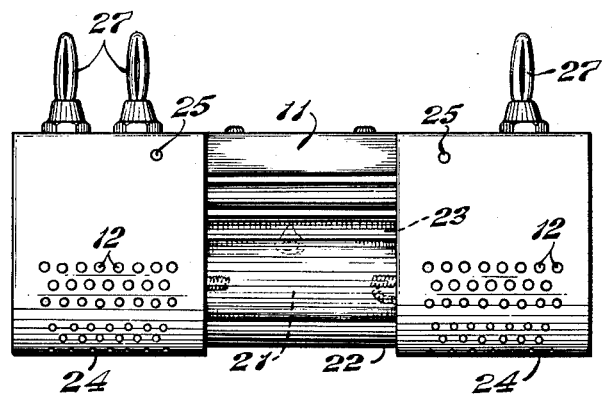
Figure 8:
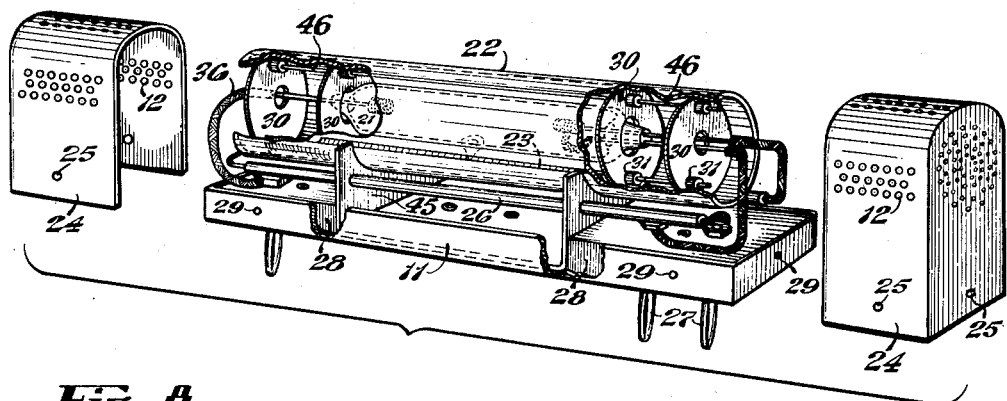
Figure 9:
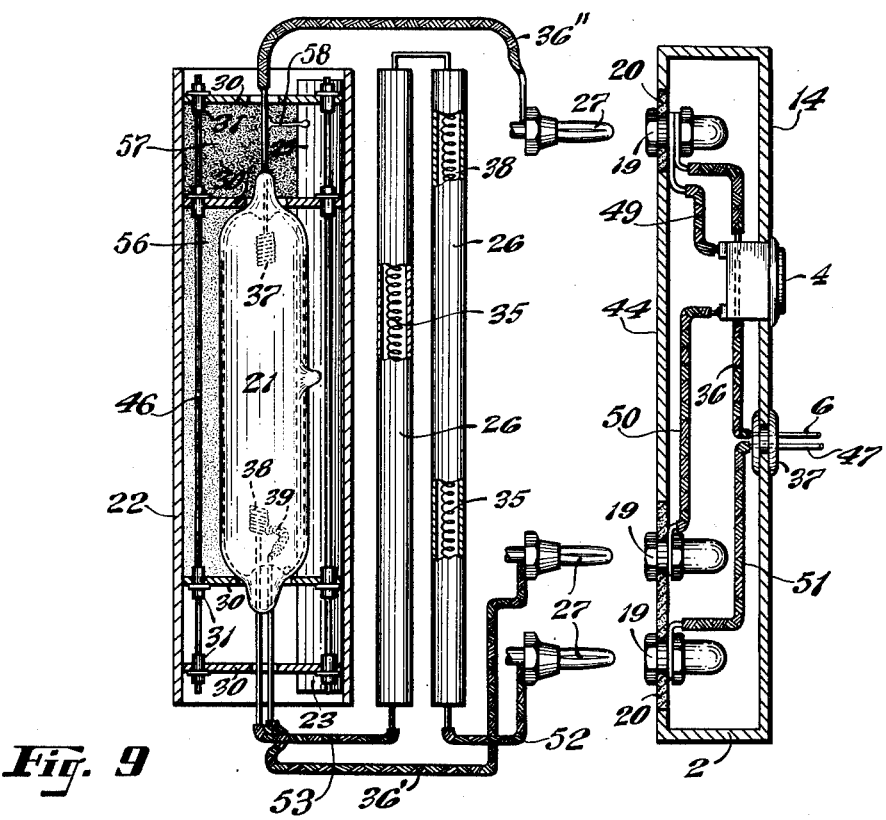

The invention will be more readily understood by reference to the accompanying drawings which illustrate one preferred embodiment of the invention. In these drawings, Figure 1 is an end view in elevation of the closed pocket sun health lamp, while Figure 2 is a similar view with the lamp opened to normal operating position, part of one side being shown in cross section. A rear view, in elevation, of the closed lamp is depicted in Figure 3, while Figure 4 shows a front view in elevation, of the open lamp with the plug-in radiation unit removed. A similar front view, with the plug-in radiation unit in place is shown in Figure 5. Figures 6 and 7 present a plan view and side view, respectively, of the plug-in radiation unit, while Figure 8 depicts (with some parts broken away) an exploded view, in perspective, of the same plug-in radiation unit. A plan view of the plug-in radiation unit and rear portion of the lamp, partly in cross section and showing the wiring and connections between the mercury vapor arc tube and the ballast resistors, plugs and sockets, is illustrated in Figure 9. Figures 10, 11, 12 and 13 depict various schematic wiring diagrams and circuit connections by means of which the lamp may be operated. Similar numerals refer to similar parts in the various figures.

Referring again to the drawings, numeral 1 represents a hollow rectangular case which opens in half at the sides, the opening plane being designated as 42. The case has convex sides or covers 1 and 5, top sides 3 and 55 of the respective halves, corresponding front sides 40 and 41, respectively, and corresponding bottom sides 3' and 55' respectively. The back edges of covers 1 and 5 are attached to back 14 of narrow rectangular box-shaped housing 2 by means of piano hinges 16 and 16' respectively. The case has sufficient inner width between covers 1 and 5 to allow accommodation therein of housing 2 when covers 1 and 5 are closed, allowing exposure only of a portion of back 14 of housing 2 in which is housed some of the wiring for the circuits employed.

The front junction edges 42 of front sides 40 and 41 are provided with inside flanges 43 which act as anchors for side edges 8 of concave metal plate reflectors 7 mounted inside of both covers 1 and 5 of the case. Side edges 9 of reflectors 7 abut against the respective side walls of housing 2. Since reflectors 7 are inserted under compression, they act as springs in keeping the covers open and facilitate in snapping them shut. Space 10 between the reflectors is filled with a heat-resisting insulating material such as spun glass fiber matting of suitable thickness, and the like.

The front face 44 of housing 2 is provided with the necessary plug-in socket members 19 disposed on insulating mountings 20, the socket members preferably being of female type to accommodate plugs 27 provided on the plug-in radiation unit.

The plug-in radiation unit, which contains the mercury arc, ballast, and filter, is provided with flat mounting plate 11 through the back of which protrude insulated plugs 27. Projecting from the front of plate 11, and perpendicular thereto, is a cradle 45 for holding resistance ballast cylinders 26 and the arc assembly.

The arc assembly comprises evacuated mercury arc lamp 21 having heatable cathode 38 and anode 37, said lamp being supported and held in place by horizontally disposed, perforated insulating disks 30, preferably of mica or other rigid heat-resisting insulating material, said disks being held securely in place by vertical nickel rods 46, secured to the disks by nickel eyelets or spacers 31. A cylindrical heat resisting filter tube 22 fits tightly against the outer peripheries of disks 30, and is held in place thereon by metal end covers 24 having ventilating holes 12, said covers being attached to plate 11 by detents 25 in recesses 29, or by other means, such as screws and the like. Said covers may be lined on the inside with a light thickness of asbestos or other suitable insulating and cushioning material. A reflector 23 made of anodized, highly polished aluminum or other suitable sheet or film material is inserted between the inner surface of filter cylinder 22 and mercury vapor tube 21, and is preferably held in place by disks 30. Another suitable reflecting means comprises vaporizing or spattering or reflecting metal film, such as one of aluminum upon a limited area in the back portion of the filter tube 22 adjacent housing 2. Said reflector 23 extends only for a portion of the width of filter 22, behind lamp 21 but does not obstruct excessively the passage of radiation from the sides of the lamp which would be reflected by reflectors 7.

Lamp 21 generates ultra violet radiation of a wide range of frequencies, and the purpose of cylindrical filter 22 is to filter out the undesired wave lengths. For example, if the lamp is to be used as a sun lamp for erythemal purposes, the filter must be made of an ultra violet-transmitting glass having sharp cut-off characteristics of deleterious wavelengths, below 2800 Å. units, such as a phosphate glass of the type of Corning Glass No. 776 or other suitable filtering glasses, to eliminate radiation which is generally considered as physiologically harmful. If the lamp is to be used as a "black light" for identifying laundry markings, checks, and the like, then the filter 22 may consist of a red-purple glass filter which screens out the visible rays and allows ultra violet radiation to penetrate therethrough. Other filters may be used for other purposes, but the present sun lamp is primarily intended to be used as a health lamp, in which case, if the proper ultra violet radiation is filtered out by filter 22, it is possible to employ the lamp for "sun-tanning" purposes without the need of using special goggles now employed with conventional sun lamp units.

Mercury arc lamp 21 which contains some mercury and argon is preferably made of quartz or other ultra violet-transmitting glass such as a silica-rich glass known as "Vycor" which contains about 95% silica. Electron-emitting cathodes 37 and 38 are preferably treated with barium azide solution in accordance with the method outlined in copending application Ser. No. 9,183 filed on February 18, 1948 by Michel E. Macksoud, issued as Patent 2,525,262 on October 10, 1950.

Ballast resistors 26 comprise cells of preferably oxidation-resistant resistance wire 35 such as Nichrome or other suitable material, encased in ceramic tubes 26. They are preferably cemented inside tubes 26 in a temperature-resistant cement. These ballast units become hot during use and they are so disposed behind arc tube 21 so that the liberated heat from the ballast is projected and reflected upon lamp 21, thereby increasing appreciably the efficiency of said lamp. Also, the infra-red radiation generated by the ballast blends with the ultra violet radiation to give sufficient warmth, approximating the effect of sunshine radiation.

As can be readily followed from Figure 9, the circuit is as follows: When the lamp is started, current from outlet leads 6 and 47 enters switch 4 by lines 36 and 49, at which time button switch 4 is pushed for a moment, making contact with line 50, thence through socket 19, plug 27, line 36', starting filament coil 39 and electrode 38, thence through line 43, series-connected ballasts 26, line 52, plug 27, socket 19, line 51 and back to plug lead 47. During the moment of pressing of button switch 4, cathode 39 is heated sufficiently to cause ionization of the inert gas content of the tube, such as argon, producing a conducting atmosphere within the evacuated mercury-containing tube 21, and at the same time causing a heating of electrode 38 adjacent thereto.

Thereafter, pressure is released from button switch 4, and the current from lead 6 follows the following circuit: Through line 49, socket 19, plug 27, line 36'', anode 37, already ionized gas in tube 21, electrode 38, line 53, ballasts 26, line 52, plug 27, socket 19, line 51 and out through plug outlet 47 which emerges from housing 14 through insulating grommet 37. This latter circuit is the one employed when the lamp is in normal use.

Figures 10, 11:
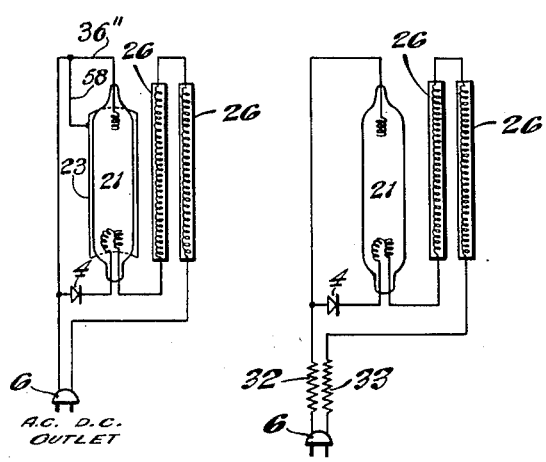
Figures 12, 13:
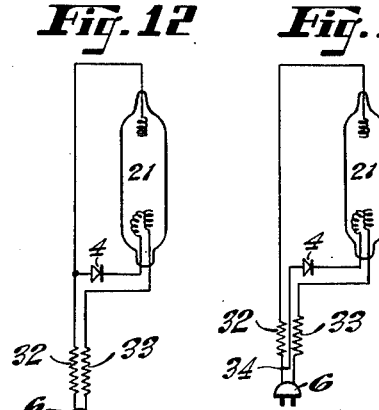

In effect, the circuit outlined for Figure 9 is shown diagrammatically in Figure 10. Figure 11 shows a circuit in which dual resistors 32 and 32' may be incorporated as part of line cord 6, while Figure 12 shows that the entire ballast resistance may be incorporated in coils 32 and 33 of the line cord. In Figure 13, the circuit is similar to that shown in Figure 12, with the exception that one resistance ballast 32 may be shunted out during starting by shunt 34 which leads to switch 4.

The oxidized metal electrodes employed in the construction of lamp 21 may be welded together by the technique outlined in copending application Ser. No. 13,363, filed on March 6, 1948, by Michel E. Macksoud, now abandoned.

Filter 22 and end covers 24 are shorter in overall length than the distance between top and bottom sides 3 and 3' and 55 and 55'. Also, although the plug-in radiation unit extends from housing 2 so that arc lamp 21 is substantially centrally disposed within the case when the covers are closed, there is enough room within the case between reflectors 7 to accommodate the plug-in radiation unit when the case is closed and, by means of this type of design, construction and assembly, it is possible to employ a case only 5½" long, 3½" wide and 7⅞" thick at its largest dimension, and these dimensions may be even smaller, if desired.

It will be observed that the present sun health lamp unit, although very compact and light in weight, still possesses interchangeability features which add considerably to the usefulness of the unit. For example, if the radiation unit is damaged, or otherwise becomes inoperable, it may be readily unplugged and a new unit inserted by a mere plugging operation. If the reflectors become damaged or discolored, they may be readily removed by prying them out. The lamp may be hung on a wall or elsewhere by using hanger 13 provided for that purpose.

One of the important features of the sun health lamp of the present invention is the highly effective and efficient radiation pattern which it generates, which pattern is useful for body exposure. The chords of the two reflectors make an angle of approximately 130° to 140° with each other and the lamp is centrally disposed therebetween. This design, together with use of rectangular, concave reflectors, projects a concentrated beam of radiation when the body is exposed a few feet away from the lamp. This enables one to place the lamp on a table or bureau and sit in front of the open lamp and obtain a sun tan by several exposures of a few minutes each. Due to the insulation 10 between the covers and the reflectors, it is possible to hold the sun lamp in the hand for a reasonable period of time in excess of the period normally required for exposure and thereby expose any accessible portion of the body to the radiation without suffering inconvenience. Locking of the covers is facilitated by providing coacting snap lock members 17 and 18 on lips 43 of the front sides of the case. Other suitable clamp locking devices may be employed.

Although a preferred embodiment has been disclosed in the drawings, it is to be understood that variations are possible. For example, front face 44 of housing 2 may be a concave polished reflector, substituting for reflector 23, in which case ballast tubes 26 would be disposed between reflector 44 and lamp 21.

As indicated in Figure 9, it is possible to provide the inside surface of cylindrical filter 22 with a coating of frosting 56 to eliminate an irregular and uneven radiation pattern and to diffuse the radiation to provide a uniform intensity pattern and to eliminate high spots and irregular or intense radiation areas. It is also possible to coat the inside surface (frosted or unfrosted) of filter 22 with a thin film of a fluorescent ultra violet radiating phosphor 57 which will radiate wave lengths in the erythemal range. Such a phosphor coating may convert the harmful ultra violet radiation into beneficial radiation in the erythemal range. When applied to the unfrosted tube 22, such a phosphor will also act as a diffuser for the ultra violet radiation generated. Such phosphors are well known in the art. When filter 22 is coated with such a phosphor, said filter 22 may be made of ultra violet transmitting glass, the phosphor coating acting to transform or convert the harmful ultra violet energy into beneficial erythemal energy.

Also, as indicated in Figures 9 and 10, it is possible to connect electrode lead 36" with conducting reflector 23, in conducting relation therewith, by means of conductor 58, which operation will have the effect of impressing a charge or voltage upon reflector 23 and facilitate ionization of the gas in arc tube 21 and also increase the efficiency thereof during operation or starting. In such case, it is important to see that reflector 22 completely insulates reflector 23 and that no grounding of the reflector to the case takes place.

I claim:

1. A pocket sun health lamp having a case, a small mercury arc tube capable of generating and emitting ultra-violet light, a cylindrical filter surrounding said tube, a ballast resistor, and means for mounting said tube, filter and resistor in the case, said means comprising a housing mounted on the case and having sockets therein, a base, a cradle supported by said base, a plurality of apertured discs mounted in said filter, the apertures in said discs surrounding the opposite end portions of said tube and securing said tube in spaced relation in said filter, said cradle supporting said filter, tube mounted therein and said resistor, and end cover clamps surrounding the end portions of said filter and base and securing said tube, filter, resistor and base together, and plugs secured to said base positioned in said sockets for securing said base to said housing.

2. A pocket sun health lamp as set forth in claim 1 further characterized in that said means further includes rods extending through said discs and securing said discs in place about the end portions of said tube.

3. A pocket sun health lamp as set forth in claim 1 further characterized in that said tube is cylindrical and the opposite end portions have a reduced diameter, and wherein said discs surround only the reduced end portions.

4. A pocket sun health lamp as set forth in claim 1 further characterized in that said cover clamps have heat dissipating apertures therein.

5. A pocket sun health lamp as set forth in claim 1 further characterized in that an arcuate reflector is positioned between said tube and said filter and is secured in said filter by said discs.

MICHEL E. MACKSOUD.

REFERENCES CITED

The following references are of record in the file of this patent:

UNITED STATES PATENTS

| Number | Name | Date |
|---|---|---|
| 2,347,672 | Dircksen et al. | May 2, 1944 |
| 2,348,617 | Furedy | May 9, 1944 |
| 2,369,987 | Sperti | Feb. 20, 1945 |
| 2,382,939 | Koch | Aug. 14, 1945 |
| 2,423,884 | Glass | July 15, 1947 |

FOREIGN PATENTS

| Number | Country | Date |
|---|---|---|
| 648,387 | France | June 21, 1927 |

OTHER REFERENCES

L. & C. Mayers Co. Catalog 1942, p. 283.
Electric Service Mfg. Co. Catalog 1947, p. 119A.